April 16, 1940.  J. THEIS  2,197,670
RIDGE GUIDE
Filed April 25, 1939  2 Sheets-Sheet 2
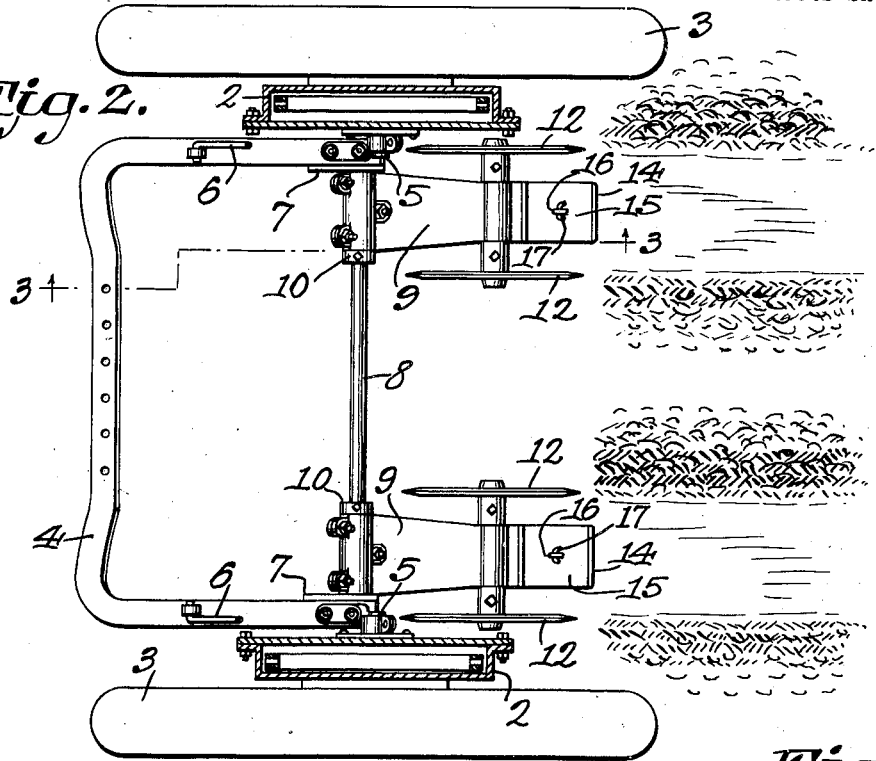
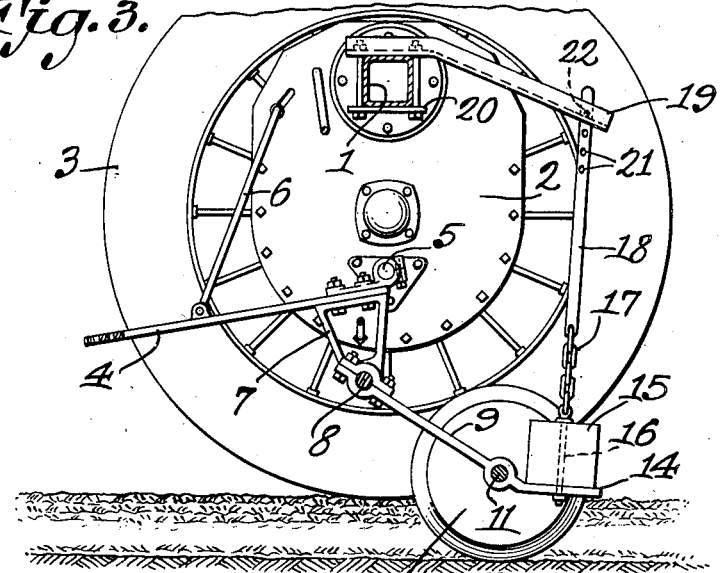
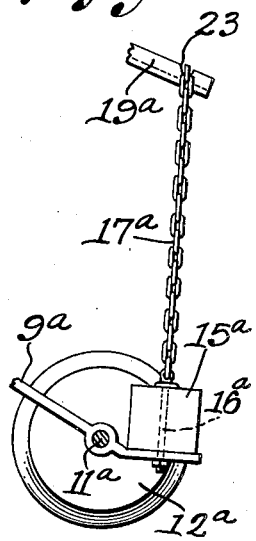
Joseph Theis INVENTOR.
BY *[signature]*
ATTORNEYS.

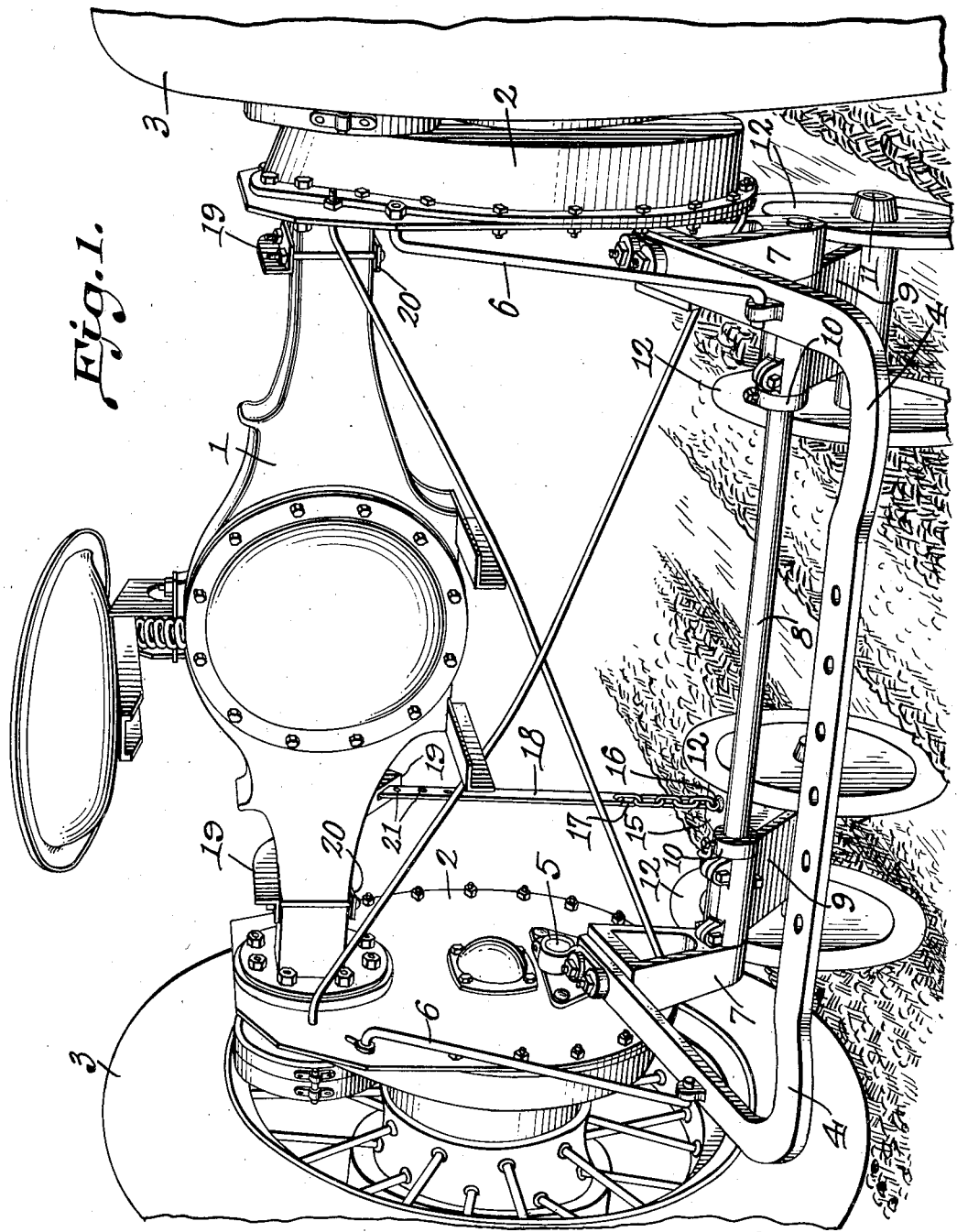

Patented Apr. 16, 1940

2,197,670

UNITED STATES PATENT OFFICE 2,197,670

RIDGE GUIDE

Joseph Theis, Hutchinson, Kans.

Application April 25, 1939, Serial No. 270,020

4 Claims. (Cl. 97—49)

For reasons well understood by persons accustomed to till the soil, it is desirable to have the ground wheels of a tractor ride on the ridges of the soil. The wheels of the tractor, however, tend to skid laterally, especially if the wheels are provided with inflatable tires of the usual construction.

In view of the foregoing, the present invention aims to provide a simple but effective means whereby the wheels of a tractor will be held in place on the ridges and be prevented from sliding laterally off the ridges.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in perspective, a portion of a tractor equipped with the device forming the subject matter of this application;

Fig. 2 is a horizontal sectional view;

Fig. 3 is a section taken approximately on the line 3—3 of Fig. 2;

Fig. 4 is a vertical sectional detail showing a modification.

Referring to Figs. 1, 2 and 3, there is shown a portion of the frame of a tractor, including a differential housing 1, to which depending casings 2 are secured, the casings carrying the ground wheels 3 of the tractor. The numeral 4 marks a U-shaped draw bar, the forward ends of the side arms of which are pivotally connected at 5 to the casings 2. The draw bar 4, however, ordinarily is sustained against vertical swinging movement, by means of inclined braces 6, detachably assembled with the side arms of the draw bar 4 and with the casings 2.

In carrying out the invention, depending hangers 7 are securely but detachably connected to the side arms of the bar 4, adjacent to the places 5 where the side arms of the draw bar are connected to the casings 2. In the hangers 7 are mounted the ends of a transverse support or rod 8.

Forwardly presented arms 9 are provided, and their rear ends are mounted to turn on the support 8, so that the arms can be swung upwardly if desired. The rear ends of the arms 9 are interposed between the hangers 7 and set collars 10 on the support 8.

In the intermediate portions of the arms 9, shafts 11 are mounted to rotate. Soil engaging disks 12 are secured to the shafts 11 and are located on opposite sides of the arms 9. The arms 9 have forward extensions 14, on which are mounted weights 15 held in place by securing elements 16, such as eye-bolts.

Suspension members are provided, and may be of various forms without departing from the spirit of the invention. In the embodiment of the invention disclosed in Figs. 1, 2 and 3, the suspension members comprise chains 17 connected to the eye-bolts 16, and upwardly extended rods 18, having their lower ends connected to the chains 17.

The rods 18 are vertically adjustable in forwardly extended and downwardly inclined bracket bars 19, secured on the differential housing 1 by clamps 20. There are holes 21 in the rods 18, through which may be inserted pins 22 or the like, which, cooperating with the bracket bars 19, limit the downward swinging movement of the arms 9, and constitute, also, a means whereby, at the will of the operator, the arms 9 may be swung upwardly, until the disks 20 are out of engagement with the ground, such a consideration being of importance when the tractor moves over a highway or the like.

The suspension members need not be constructed as shown in Fig. 3 of the drawings. For instance, recourse may be had to the structure depicted in Fig. 4 of the drawings. In Fig. 4, parts hereinbefore described have been designated by numerals already used, with the suffix "a." In Fig. 4, the chains 17a are used, and selected links of the chains may be engaged in notches or seats 23, formed in the bracket bars 19a.

When the device is in the condition shown in Figs. 1 and 3, the disks 12 will follow the furrows of the soil, and the wheels 3 of the tractor will be caused to ride the ridges of the soil, without any likelihood that the wheels will skid laterally off the ridges.

The device is simple in contruction, but will be found thoroughly advantageous for the ends in view.

Having thus described the invention, what is claimed is:

1. In a device for preventing the ground wheels of a tractor from sliding laterally off the ridges in the soil, a tractor having a draw bar, forwardly presented arms, means for mounting the arms on the draw bar, for vertical swinging movement, and soil engaging disks journaled on the arms.

2. In a device for preventing the ground wheels of a tractor from skidding off ridges in the soil, a tractor having a draw bar, hangers fixed to and depending from the draw bar, a support terminally mounted in the hangers, arms mounted to swing vertically on the support, and disks journaled on the arms and adapted for engagement with the soil.

3. In a device for preventing the ground wheels of a tractor from skidding laterally off ridges in the soil, a tractor, arms, means for mounting the arms on the tractor for vertical swinging movement, soil engaging disks journaled on the arms, and means associated with the arms and with the tractor for holding the disks at adjusted heights.

4. In a device for preventing the ground wheels of a tractor from skidding laterally off ridges in the soil, a tractor including a draw bar, a support carried by the draw bar, arms mounted to swing vertically on the support, soil engaging disks carried by the arms, weights, securing elements connecting the weights to the arms, suspension members having their lower ends connected to the securing elements, brackets carried by the tractor, and means for securing an adjustable vertical connection between the suspension members and the brackets.

JOSEPH THEIS.